(12) United States Patent
Liu

(10) Patent No.: US 12,099,859 B2
(45) Date of Patent: Sep. 24, 2024

(54) HOME PAGE INTERFACE RECOMMENDATION METHOD, APPARATUS AND DEVICE FOR OPERATION AND MAINTENANCE PLATFORM

(71) Applicant: INSPUR SUZHOU INTELLIGENT TECHNOLOGY CO., LTD., Jiangsu (CN)

(72) Inventor: Chengcheng Liu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/270,206

(22) PCT Filed: Nov. 30, 2021

(86) PCT No.: PCT/CN2021/134633
§ 371 (c)(1),
(2) Date: Jun. 29, 2023

(87) PCT Pub. No.: WO2023/029256
PCT Pub. Date: Mar. 9, 2023

(65) Prior Publication Data
US 2024/0061691 A1     Feb. 22, 2024

(30) Foreign Application Priority Data
Sep. 1, 2021 (CN) .......................... 202111017594.3

(51) Int. Cl.
*G06F 9/451*     (2018.01)
(52) U.S. Cl.
CPC .................................. *G06F 9/451* (2018.02)

(58) Field of Classification Search
CPC ....... G06F 9/451; G06F 3/048; G06F 11/3438
See application file for complete search history.

(56) References Cited

U.S. PATENT DOCUMENTS

| 10,210,530 | B1 | 2/2019 | Peters |
| 2016/0188166 | A1* | 6/2016 | Wang .................... G06F 3/0482 715/745 |

(Continued)

FOREIGN PATENT DOCUMENTS

| CN | 105589914 A | 5/2016 |
| CN | 106034246 A | 10/2016 |

(Continued)

*Primary Examiner* — Andrey Belousov
(74) *Attorney, Agent, or Firm* — IPro, PLLC

(57) ABSTRACT

Disclosed in the present application is a home page interface recommendation method for an operation and maintenance platform. In the method, a home page recommendation interface is automatically learned and intelligently generated on the basis of daily operation behavior habits of different roles and different users, such that no matter a new user or an old user may obtain home page recommendation conforming to his/her positioning, the use efficiency of the operation and maintenance personnel on the operation and maintenance platform is greatly improved, the operation and maintenance time is shortened, and the cost is reduced. In addition, the present application also provides a home page interface recommendation apparatus and device for an operation and maintenance platform, and the technical effects of the home page interface recommendation apparatus and device correspond to the technical effects of the method.

19 Claims, 5 Drawing Sheets

(56) References Cited

U.S. PATENT DOCUMENTS

| | | |
|---|---|---|
| 2016/0277800 A1 | 9/2016 | Wang |
| 2017/0024423 A1 | 1/2017 | Liang et al. |
| 2017/0186101 A1 | 6/2017 | Kapoor et al. |
| 2023/0004832 A1* | 1/2023 | Sahasi .................. H04L 67/306 |

FOREIGN PATENT DOCUMENTS

| | | |
|---|---|---|
| CN | 110148028 A | 8/2019 |
| CN | 112487301 A | 3/2021 |
| CN | 112507213 A | 3/2021 |
| CN | 113094597 A | 7/2021 |
| CN | 113448675 A | 9/2021 |

* cited by examiner

HOME PAGE INTERFACE RECOMMENDATION METHOD, APPARATUS AND DEVICE FOR OPERATION AND MAINTENANCE PLATFORM

CROSS-REFERENCE TO RELATED APPLICATION

This application claims the priority of the Chinese Patent application filed on September 181, 2021 before the China National Intellectual Property Administration with the application number of 202111017594.3, and the title of "HOME PAGE INTERFACE RECOMMENDATION METHOD, APPARATUS AND DEVICE FOR OPERATION AND MAINTENANCE PLATFORM", which is incorporated herein in its entirety by reference.

FIELD

The present disclosure relates to the field of computer technologies and, more particularly, to a method for recommending a home page interface of an operation and maintenance platform, an apparatus and a device.

BACKGROUND

With the development of science and technology, servers that support a large number of data interactions basically need to be managed through an operation and maintenance software platform. However, most operation and maintenance platforms show fixed existing functions on their home pages. In the operation and maintenance platforms, fixed home pages cannot meet needs of operation and maintenance workers, and operation and maintenance personnel of different characters and different users have different requirements for the operation and maintenance platforms. During the process of using, by frequent clicks and jumps, the operation and maintenance personnel may reach interfaces they want to handle with.

SUMMARY

The object of present disclosure is to provide a method for recommending a home page interface of an operation and maintenance platform, an apparatus and a device, so as to solve the problem of low operation and maintenance efficiency caused by the fact that the operation and maintenance personnel may only reach a target interface by frequent clicks. Solutions are as follows:

In a first aspect, the present disclosure provides a method for recommending a home page interface of an operation and maintenance platform, including:
monitoring an operation behavior performed by a user on an interface on the operation and maintenance platform to obtain operation behavior data, wherein the operation behavior data comprises: interface second-click times and an interface use time period, and the interface second-click times refer to times of clicks by the user on a current interface to enter a deeper interface after the interface is opened;
updating a user model table of the user according to the operation behavior data;
updating a character model table of a character according to user model tables of all users under a same character;
calculating an interface recommendation probability of the user according to the user model table of the user;
calculating an interface recommendation probability of the character according to the character model table of the character;
when a request for logging into the operation and maintenance platform is received, in a case that a user sending the request is a new user, determining target characters of the user sending the request, obtaining interface recommendation probabilities of the target characters, and generating an interface recommendation link according to the interface recommendation probabilities of the target characters; and in a case that the user sending the request is a regular user, obtaining an interface recommendation probability of the user sending the request, and generating an interface recommendation link according to the interface recommendation probability of the user sending the request;
wherein calculating the interface recommendation probability of the user according to the user model table of the user comprises:
calculating an interface second-click rate according to the user model table of the user, and calculating the interface recommendation probability of the current interface with respect to the user according to a principle that an interface with a greater interface second-click rate is not a final interface, wherein the interface second-click rate is obtained by calculating according to an interface click-through frequency and the interface second-click times.

In some embodiments, the operation behavior data further comprises: the interface click-through frequency, interface residence time, and interface operation times.

In some embodiments, calculating the interface recommendation probability of the user according to the user model table of the user comprises:
calculating an interface click-through probability of the current interface according to the interface click-through frequency of the current interface and the interface click-through frequencies of all interfaces of the operation and maintenance platform;
calculating an interface residence probability of the current interface according to interface residence time of the current interface and the interface residence time of all the interfaces of the operation and maintenance platform;
calculating an interface operation probability of the current interface according to interface operation times of the current interface and the interface operation times of all the interfaces of the operation and maintenance platform;
calculating an interface use time period probability of the current interface according to an interface use time period of the current interface and the interface use time periods of all the interfaces of the operation and maintenance platform; and
calculating the interface recommendation probability of the current interface with respect to the user according to the interface click-through probability, the interface residence probability, the interface operation probability, the interface use time period probability, and the interface second-click rate and on the basis of the principle that the interface with the greater interface second-click rate is not the final interface.

In some embodiments, the operation behavior data further comprises: interface last use time;
correspondingly, calculating the interface recommendation probability of the user according to the user model table of the user comprises:

determining interfaces with difference values between interface last use time and current time less than a preset threshold, and obtaining an interface set;

for each interface of the interface set, calculating an interface click-through probability of the interface according to the interface click-through frequency of the interface and the interface click-through frequencies of all the interfaces of the operation and maintenance platform;

for each interface of the interface set, calculating an interface residence probability of the interface according to the interface residence time of the interface and the interface residence time of all the interfaces of the operation and maintenance platform;

for each interface of the interface set, calculating an interface operation probability of the interface according to the interface operation times of the interface and the interface operation times of all the interfaces of the operation and maintenance platform;

for each interface of the interface set, calculating an interface use time period probability of the interface according to the interface use time period of the interface and the interface use time periods of all the interfaces of the operation and maintenance platform; and calculating the interface recommendation probability of the current interface with respect to the user according to the interface click-through probability, the interface residence probability, the interface operation probability, the interface use time period probability, and the interface second-click rate.

In some embodiments, calculating the interface recommendation probability of the current interface with respect to the user according to the interface click-through probability, the interface residence probability, the interface operation probability, the interface use time period probability, and the interface second-click rate comprises:

according to a target formula, calculating the interface recommendation probability of the current interface with respect to the user according to the interface click-through probability, the interface residence probability, the interface operation probability, the interface use time period probability, and the interface second-click rate, wherein the target formula is:

$$f_{V_i} = (\alpha f_{P_i} + \beta f_{T_i} + \gamma f_{O_i} + \delta f_{C_i}) * \left(1 - \frac{S_i}{P_i}\right)$$

wherein $f_{P_i}$, $f_{T_i}$, $f_{O_i}$, $f_{C_i}$ respectively represent the interface click-through probability, the interface residence probability, the interface operation probability, and the interface use time period probability; $\alpha$, $\beta$, $\gamma$, $\delta$ represent weighting coefficients; $S_i/P_i$ represents the interface second-click rate; $P_i$ represents the interface click-through frequency; $S_i$ represents the interface second-click times; i represents an interface reference sign; and $f_{V_i}$ represents the interface recommendation probability of an $i^{th}$ interface.

In some embodiments, monitoring the operation behavior performed by the user on the interface on the operation and maintenance platform to obtain the operation behavior data comprises:

monitoring the operation behavior performed by the user on the interface on the operation and maintenance platform in days to obtain the operation behavior data, wherein correspondingly, in the user model table and the character model table, fields corresponding to the interface use time period are used for recording times of use of the interface by the user and the character within each period.

In some embodiments, updating the user model table of the user according to the operation behavior data comprises:

determining whether the user model table of the user records historical operation behavior data;

in a case that the user model table of the user records the historical operation behavior data, updating the user model table of the user according to the operation behavior data and the historical operation behavior data; and in a case that the user model table of the user does not record historical the operation behavior data, writing the operation behavior data into the user model table of the user.

In some embodiments, generating the interface recommendation link according to the interface recommendation probabilities of the target characters comprises:

generating a preset quantity of interface recommendation links according to the interface recommendation probabilities of the target characters from large to small.

In a second aspect, the present disclosure provides an apparatus for recommending a home page interface of an operation and maintenance platform, comprising:

a behavior monitoring module, configured to monitor an operation behavior performed by a user on an interface on the operation and maintenance platform to obtain operation behavior data, wherein the operation behavior data comprises: interface second-click times and an interface use time period, and the interface second-click times refer to times of clicks by the user on a current interface to enter a deeper interface after the interface is opened;

a user table updating module, configured to update a user model table of the user according to the operation behavior data;

a character table updating module, configured to update a character model table of a character according to user model tables of all users under a same character;

a user recommendation probability calculation module, configured to calculate an interface recommendation probability of the user according to the user model table of the user;

a character recommendation probability calculation module, configured to calculate an interface recommendation probability of the character according to the character model table of the character;

a recommendation module, configured to: when a request for logging into the operation and maintenance platform is received, in a case that a user sending the request is a new user, determine target characters of the user sending the request, obtain interface recommendation probabilities of the target characters, and generate an interface recommendation link according to the interface recommendation probabilities of the target characters; and in a case that the user sending the request is a regular user, obtain an interface recommendation probability of the user sending the request, and generate an interface recommendation link according to the interface recommendation probability of the user sending the request;

wherein the user recommendation probability calculation module is configured to: calculate an interface second-click rate according to the user model table of the user, and calculate the interface recommendation probability of the current interface with respect to the user according to a principle that an interface with a greater interface second-click rate is not a final interface, wherein the interface second-click rate is obtained by calculating according to an interface click-through frequency and the interface second-click times.

In a third aspect, the present disclosure provides a device for recommending a home page interface of an operation and maintenance platform, comprising:
 a memory, configured to store a computer program; and
 a processor, configured to run the computer program to implement the method for recommending the home page interface of the operation and maintenance platform stated above.

The present disclosure provides a method for recommending a home page interface of an operation and maintenance platform, including: monitoring an operation behavior performed by a user on an interface on the operation and maintenance platform to obtain operation behavior data; updating a user model table of the user according to the operation behavior data; updating a character model table of a character according to user model tables of all users under a same character; calculating an interface recommendation probability of the user according to the user model table of the user; calculating an interface recommendation probability of the character according to the character model table of the character; when a request for logging into the operation and maintenance platform is received, in a case that a user sending the request is a new user, determining target characters of the user sending the request, obtaining interface recommendation probabilities of the target characters, and generating an interface recommendation link according to the interface recommendation probabilities of the target characters; and in a case that the user sending the request is a regular user, obtaining an interface recommendation probability of the user sending the request, and generating an interface recommendation link according to the interface recommendation probability of the user sending the request.

It may be seen that the method automatically learns and intelligently generates a home page recommendation interface on the basis of daily operation behavior habits of different characters and different users, the use efficiency of the operation and maintenance platform by operation and maintenance personnel is greatly improved, the operation and maintenance time is shortened, and the cost is reduced.

In addition, the present disclosure further provides an apparatus for recommending a home page interface of an operation and maintenance platform and a device, the technical effects of which correspond to the technical effects of the above method, which are not repeated here.

BRIEF DESCRIPTION OF THE DRAWINGS

In order to explain the embodiments of the present disclosure or the technical solutions in the prior art more clearly, a brief description may be given below with reference to the accompanying drawings which are used in the description of the embodiments or the prior art, and it is obvious that the drawings in the description below are merely some embodiments of the present disclosure, and a person skilled in the art may obtain other drawings according to the provided drawings without involving any inventive effort.

DETAILED DESCRIPTION

The core of the present disclosure is to provide a method for recommending a home page interface of an operation and maintenance platform, an apparatus and a device, so that different users and different characters may obtain home page recommendations in line with own daily use habits after logging into the operation and maintenance platform, and use habits of different operations within different time periods are considered at a same time, which effectively ensures the accuracy of home page recommendation, makes operation and maintenance operations no longer cumbersome, reduces ineffective interface jump, shortens the operation and maintenance time, and greatly improves the operation and maintenance efficiency.

In order to make those skilled in the art better understand the solutions of the present disclosure, the present disclosure is further described in detail below with reference to the accompanying drawings and implementation modes. Apparently, the described embodiments are merely a part of the embodiments of the present disclosure and not all the embodiments. Based on the embodiments in the present disclosure, all other embodiments obtained by those of ordinary skill in the art without creative work all fall within the protection scope of the present disclosure.

Figure 1:
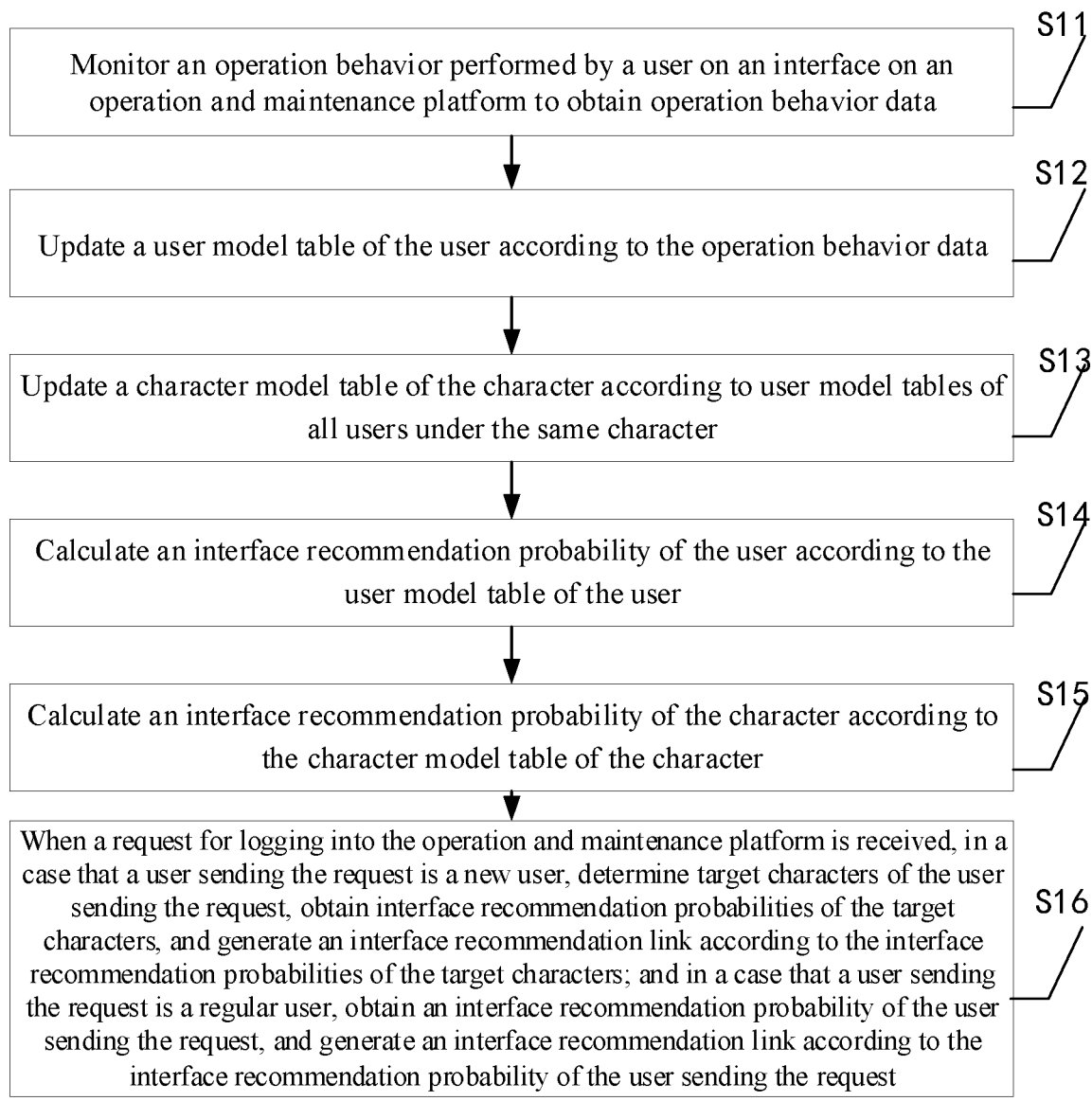
FIG. 1 is a flowchart of a first embodiment of a method for recommending a home page interface of an operation and maintenance platform according to the present disclosure.

A first embodiment of a method for recommending a home page interface of an operation and maintenance platform according to the present disclosure is described below. Referring to FIG. 1, the first embodiment includes:
 S11, monitoring an operation behavior performed by a user on an interface on the operation and maintenance platform to obtain operation behavior data.

A character model table and a user model table are created in advance in a database. Different users exist in the operation and maintenance platform, and each user has a character attribute, representing different permissions. Different tables are created respectively in advance on the basis of users and characters. Each table includes an interface click-through frequency, interface residence time, interface operation times, interface last use time, an interface second-click rate, an interface use time period, and other table fields.

Then, operations of the user are monitored. The times of click-through by the user on each interface is monitored. The residence time of the user in each interface is monitored. The times of operations performed by the user on each interface is monitored. The last use time of the user on each interface is monitored. The second-click rate of the user on each interface is monitored. The use time period of the user on each interface is monitored, and monitored data is recorded in the user model table of the database in real time. That is, the operation behavior data includes: an interface click-through frequency, interface residence time, interface operation times, an interface second-click times, and an interface use time period. The operation behavior data may further include interface last use time.

In the present embodiment, second-click refers to a behavior of the user to click a current interface to enter a deeper interface after a page is opened. A ratio of a quantity of second-clicks to a quantity of arriving at the current interface is referred to as a second-click rate.

S12, updating a user model table of the user according to the operation behavior data, and after the user model table is summarized completely, updating a character model table according to the user model table.

S13, updating a character model table of the character according to user model tables of all users under a same character.

S14, calculating an interface recommendation probability of the user according to the user model table of the user.

S15, calculating an interface recommendation probability of the character according to the character model table of the character.

Recommendation probabilities of the respective interfaces under different users and different characters are calculated. The click-through probability, residence probability, operation probability, and period probability of each interface are calculated according to data of each field in the user model table. An interface recommendation probability of a current user home page is calculated on the basis of the last use time, the second-click rate, the use time period, and the like. At the same time, the user is taken the character as a unit, the data of the respective fields of the user is counted and is recorded in the character model table, so as to calculate a home page recommendation probability of a current character.

S16, when a request for logging into the operation and maintenance platform is received, in a case that a user sending the request is a new user, determining target characters of the user sending the request, obtaining interface recommendation probabilities of the target characters, and generating an interface recommendation link according to the interface recommendation probabilities of the target characters; and in a case that the user sending the request is a regular user, obtaining an interface recommendation probability of the user sending the request, and generating an interface recommendation link according to the interface recommendation probability of the user sending the request.

For a recommended interface that is finally displayed, when a login user is a newly created user, home page interface recommendation is performed according to the interface recommendation probability of the character, otherwise, the home page interface recommendation is performed according to the interface recommendation probability of the user.

Figure 2:
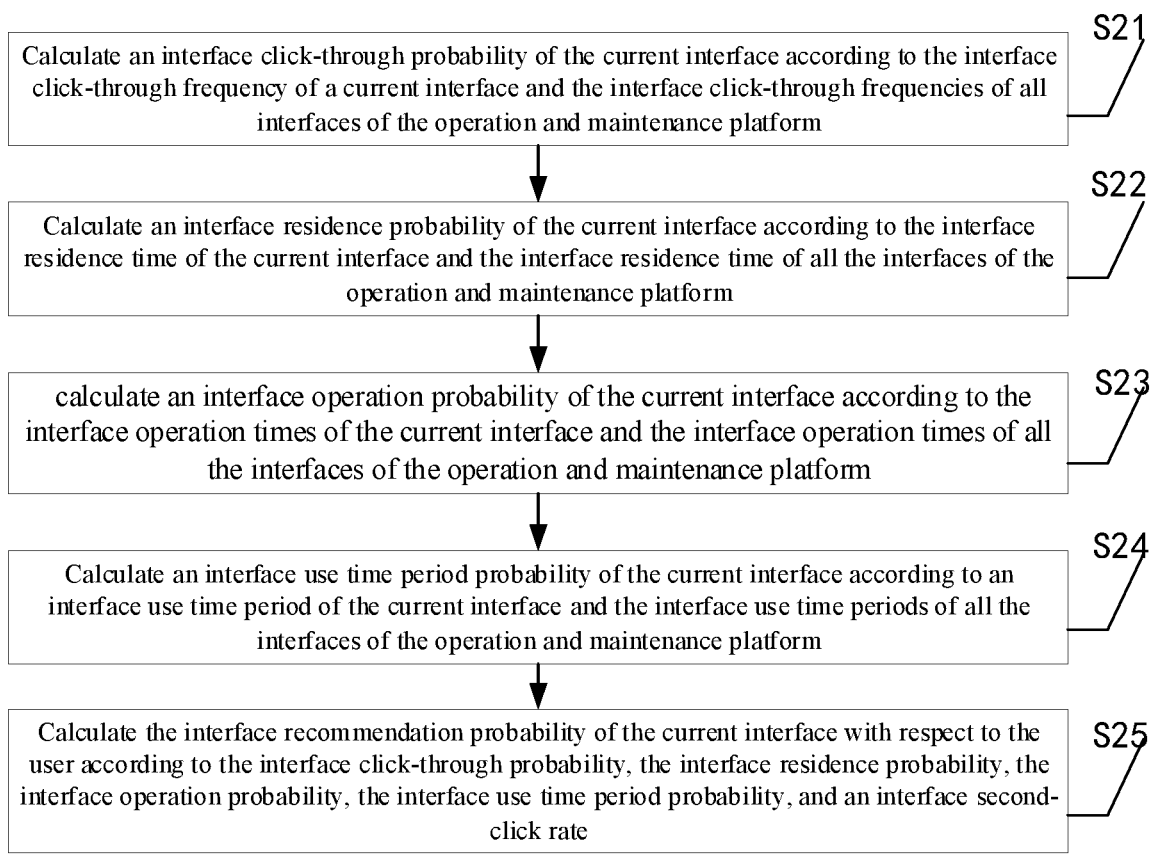
FIG. 2 is a detailed flowchart of step S14 in the first embodiment of the method for recommending a home page interface of an operation and maintenance platform according to the present disclosure.

As shown in FIG. 2, S14 mentioned above includes the following steps:

S21, calculating an interface click-through probability of the current interface according to the interface click-through frequency of a current interface and the interface click-through frequencies of all interfaces of the operation and maintenance platform;

S22, calculating an interface residence probability of the current interface according to the interface residence time of the current interface and the interface residence time of all the interfaces of the operation and maintenance platform;

S23, calculating an interface operation probability of the current interface according to the interface operation times of the current interface and the interface operation times of all the interfaces of the operation and maintenance platform;

S24, calculating an interface use time period probability of the current interface according to an interface use time period of the current interface and the interface use time periods of all the interfaces of the operation and maintenance platform; and S25, calculating the interface recommendation probability of the current interface with respect to the user according to the interface click-through probability, the interface residence probability, the interface operation probability, the interface use time period probability, and an interface second-click rate, wherein the interface second-click rate is obtained by calculating according to the interface click-through frequency and the interface second-click times.

Figure 3:
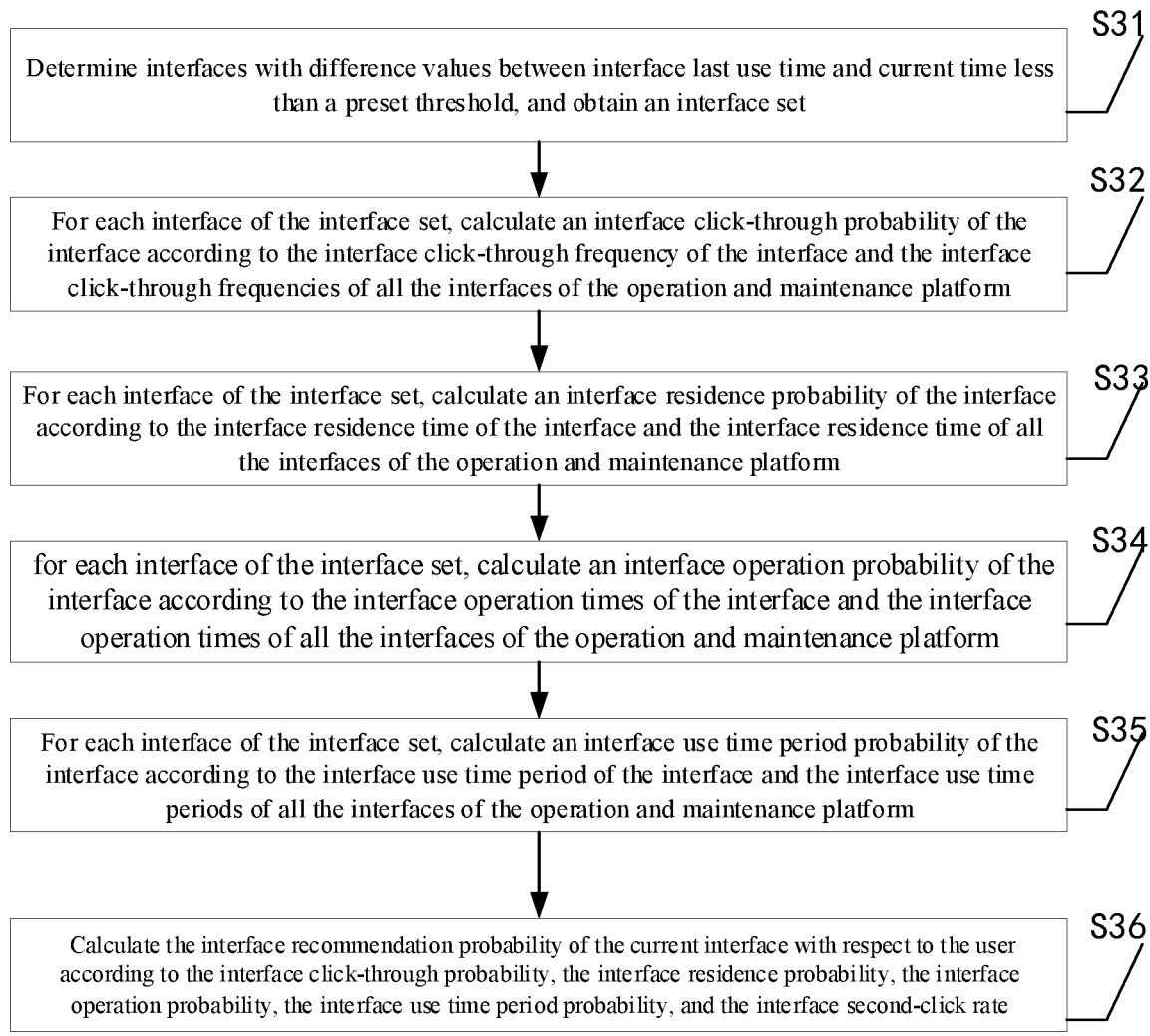
FIG. 3 is another detailed flowchart of step S14 in the first embodiment of the method for recommending a home page interface of an operation and maintenance platform according to the present disclosure.

It is worth mentioning that in practical applications, in a case that the user does not use an interface for long time, it indicates that a probability that the interface is accessed is small. Therefore, in an implementation, in the present embodiment, during the calculation of the interface recommendation probability, interfaces with difference values between interface last use time and current time less than a preset threshold are screened out. At this time, as shown in FIG. 3, S14 mentioned above includes the following steps:

S31, determining interfaces with difference values between interface last use time and current time less than a preset threshold, and obtaining an interface set;

S32, for each interface of the interface set, calculating an interface click-through probability of the interface according to the interface click-through frequency of the interface and the interface click-through frequencies of all the interfaces of the operation and maintenance platform;

S33, for each interface of the interface set, calculating an interface residence probability of the interface according to the interface residence time of the interface and the interface residence time of all the interfaces of the operation and maintenance platform;

S34, for each interface of the interface set, calculating an interface operation probability of the interface according to the interface operation times of the interface and the interface operation times of all the interfaces of the operation and maintenance platform;

S35, for each interface of the interface set, calculating an interface use time period probability of the interface according to the interface use time period of the interface and the interface use time periods of all the interfaces of the operation and maintenance platform; and S36, calculating the interface recommendation probability of the current interface with respect to the user according to the interface click-through probability, the interface residence probability, the interface operation probability, the interface use time period probability, and the interface second-click rate.

As an implementation, during monitoring of the behavior of the user, the operation behavior performed by the user on the interface on the operation and maintenance platform is monitored in days to obtain the operation behavior data. Correspondingly, in the user model table and the character model table, fields corresponding to the interface use time period are used for recording times of use of the interface by the user and the character within each period.

The process of updating the user model table is as follows: determining whether the user model table of the user records historical operation behavior data; in a case that the user model table of the user records the historical operation behavior data, updating the user model table of the user according to the operation behavior data and the historical operation behavior data; and in a case that the user model table of the user does not record the historical operation behavior data, writing the operation behavior data into the user model table of the user. That is, when there is no historical record in the user model table, the operation behavior data is directly written. However, when there is a historical record in the user model table, it is necessary to update the user model table according to a certain policy in combination with the historical operation behavior data. For example, values of the interface check-through frequency, the interface residence time, and the interface operation times in a field table are accumulated and re-stored in the user model table. The interface last use time is updated to the latest interface last use time. After second-click times are obtained by multiplying the second-click rate with the click-through frequency, a second-click rate is recalculated and re-stored in the user model table. A numerical value of the interface use time period in the operation behavior data is a period, while in the user model table, the table field corresponding to the interface use time period is used for recording the times of use of each time period. Therefore, it is necessary to determine, by matching, to use the interface again within which time period, and the numerical value corresponding to this time period is accumulated by 1.

It may be understood that the updating process of the character model table is in a similar way and will not be repeated here.

The method for recommending a home page interface of an operation and maintenance platform provided in the present embodiment includes model creation, behavior monitoring, probability calculation, and recommendation displaying. The model tables are created based the user and the character, to ensure that both new and regular users have home page recommendations that are in line with their own positioning. Based on behavior monitoring, in addition to daily statistics of the times of use and the use duration, the second-click rate is added, which may better eliminate ineffective interface clicks. In addition, time period statistics is also added, which may better position the needs of operation and maintenance personnel at different time periods. At the same time, the probability is calculated by combining various use conditions, so that a recommended interface is more suitable for the needs of different scenarios.

Figure 4:
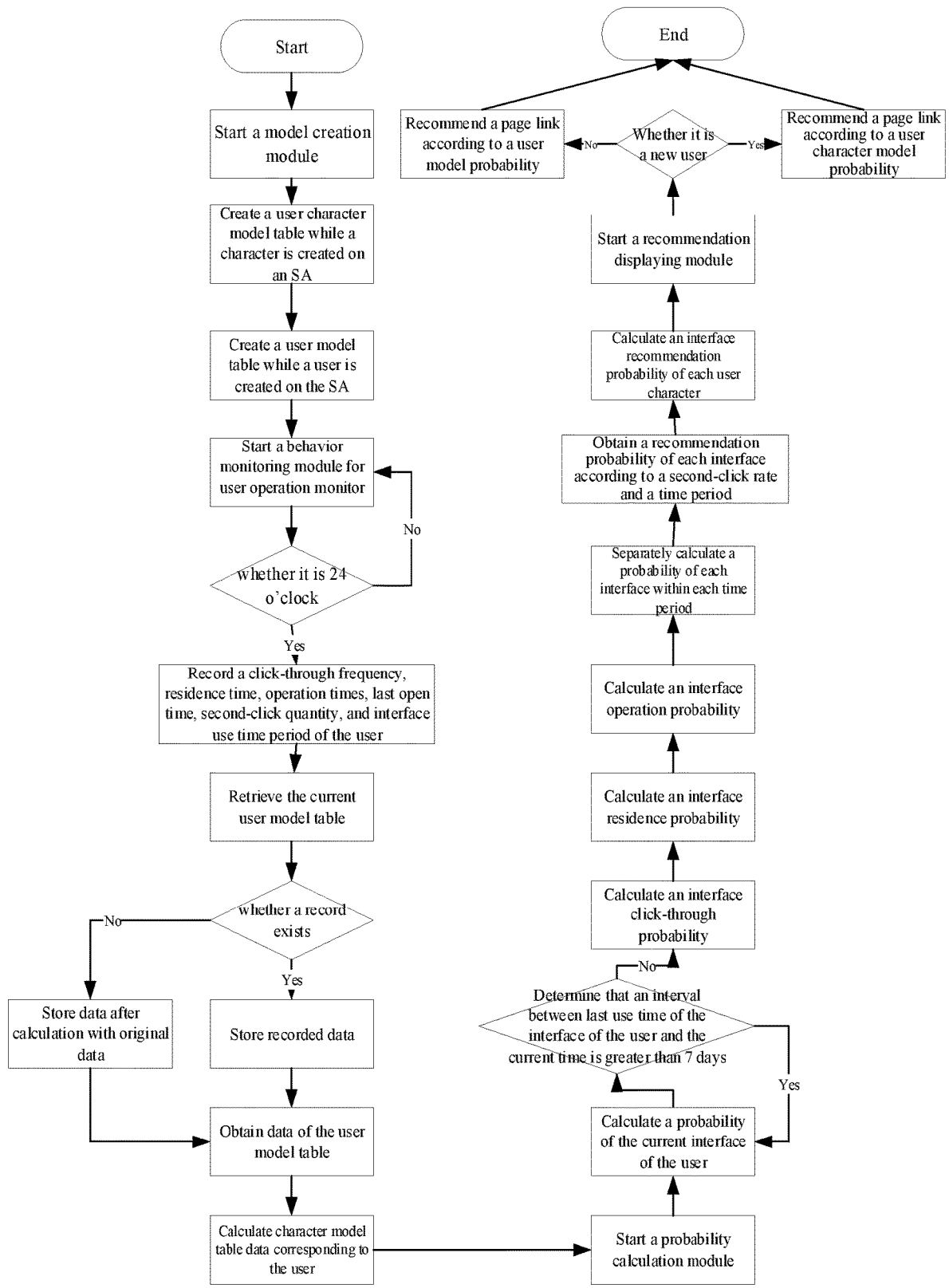
FIG. 4 is a flowchart of a second embodiment of a method for recommending a home page interface of an operation and maintenance platform according to the present disclosure.

A second embodiment of a method for recommending a home page interface of an operation and maintenance platform according to the present disclosure may be described in detail below. As shown in FIG. 4, the second embodiment includes the following steps:

S41, starting a model creation module. In a case that a character is created on the operation and maintenance platform, at a same time, a character model table is also created by taking the character as a unit. The character refers to a character attribute of a user, such as an administrator, an operator, and a user. Character model tables, such as admin_model, operator_model, user_model, and the like, are created.

S42, in a case that a user is created on the operation and maintenance platform, at a same time, creating a user model table by taking the user as a unit, for example, user1_model and user2_model.

S43, setting that the operation and maintenance platform has a total of n interfaces. In a case that interface View is denoted as V, the user model table and the character model table both record data of respective fields of interface 1 to interface n by a total of 29 fields, including an interface click-through frequency, interface residence time, interface operation times, interface last use time, an interface second-click rate, and an interface use time period 0-23 (there is a total of 24 fields from 0 to 23 in hours) of a current interface.

S44, starting a behavior monitoring module to monitor a user behavior in days. After a user logs in to the operation and maintenance platform, the interface click-through frequency $P_i$, the interface residence time $T_i$, the interface operation times $O_i$, the interface last use time $L_i$, the interface second-click times $S_i$, and the interface use time period C ($0 \leq C \leq 23$) of the user on each interface i ($1 \leq i \leq n$) on the same day. There may be a plurality of time periods here.

S45, retrieving the user model table in the database; and in a case that there is no historical record in the user model table, directly entering the user model table, wherein the second-click rate is $S_i/P_i$; matching the use time period; in a case that the use time period is matched, recording 1; in a case that a record is present, obtaining values in the field tables of the interface click-through frequency, the interface residence time, and the interface operation times, accumulating the values, and re-storing to the user model table; updating the interface last use time to the latest time; after the second-click times are obtained by multiplying the second-click rate and the click-through frequency, recalculating a second-click rate, restoring the second-click rate to the database, wherein the interface use time period is the same as that described above; and in a case of this time period, accumulating 1 within this time period.

S46, after the calculation of the user model table is completed, counting the data of the character model table according to a character to which the user belongs by relying on a corresponding relationship between users and user characters of the operation and maintenance platform, wherein the calculation manner is the same as that in the previous step.

S47, starting a probability calculation module to calculate a probability that interface Vi in each user table is hit among the total interfaces. User1 model is taken as an example to determine the last use time of interface Vi. In a case that an interval between Li and current time is 7 days, Li does not participate the calculation:

The interface click-through probability is $$f_{P_i} = \frac{P_i}{\sum_{i=1}^{n} P_i};$$

the residence probability is $$f_{T_i} = \frac{T_i}{\sum_{i=1}^{n} T_i};$$

the operation probability is $$f_{O_i} = \frac{O_i}{\sum_{i=1}^{n} O_i};$$

the time period probability is $$f_{C_i} = \frac{C_i}{\sum_{i=1}^{n} C_i} (0 \leq C \leq 23).$$

According to the above calculated probabilities and a principle that an interface with a greater interface second-click rate is not a final interface, an interface recommendation probability of each time period C ($0 \leq C \leq 23$) is:

$$f_{V_i} = (\alpha f_{P_i} + \beta f_{T_i} + \gamma f_{O_i} + \delta f_{C_i}) * \left(1 - \frac{S_i}{P_i}\right)$$

wherein $\alpha$, $\beta$, $\gamma$, $\delta$ are weight numbers, which may be values between 0 and 1, as long as they ensure $\alpha+\beta+\gamma+\delta=1$.

S48, calculating a character probability of each interface according to the previous step.

S49, starting a recommendation display module; after the user logs in, obtaining current login time of the user, and generating, according to a time period, interface links with recommendation values $f_{v_i}$ sorted from large to small; and in a case that the user is a newly created user, generating interface recommendation links on the basis of the user character interface probability.

An apparatus for recommending a home page interface of an operation and maintenance platform according to an embodiment of the present disclosure will be described below. The apparatus for recommending a home page interface of an operation and maintenance platform described below may correspondingly refer to the method for recommending a home page interface of an operation and maintenance platform described above.

Figure 5:
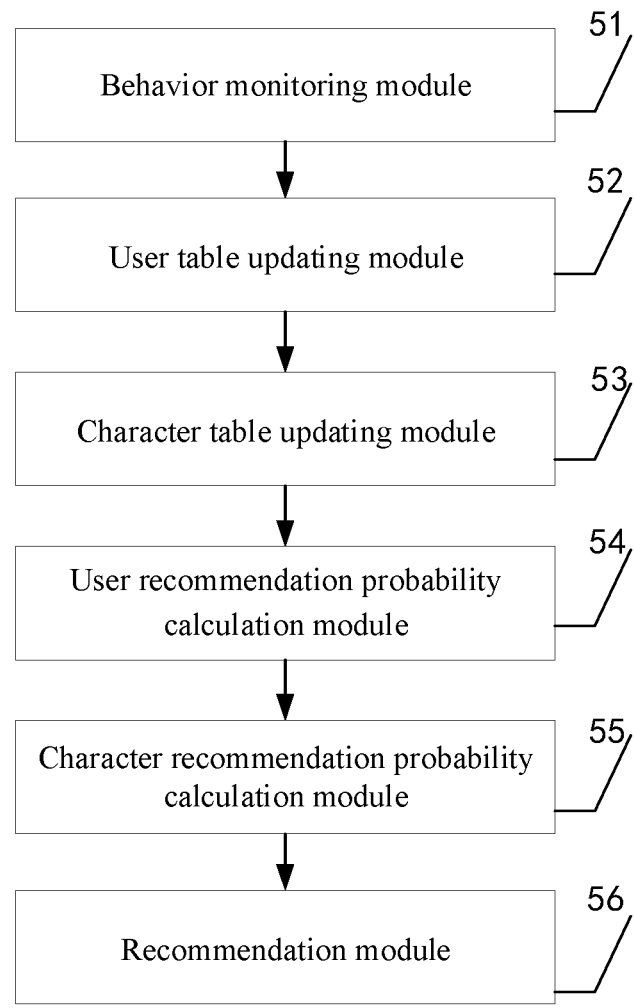
FIG. 5 is a schematic diagram of an embodiment of an apparatus for recommending a home page interface of an operation and maintenance platform according to the present disclosure.

As shown in FIG. 5, the apparatus for recommending the home page interface of the operation and maintenance platform of the present embodiment includes:

a behavior monitoring module 51, configured to monitor an operation behavior performed by a user on an interface on an operation and maintenance platform to obtain operation behavior data, wherein the operation behavior data comprises: an interface second-click times and an interface use time period, and the interface second-click times refers to a quantity of clicks by the user on a current interface to enter a deeper interface after a page is opened;

a user table updating module 52, configured to update a user model table of the user according to the operation behavior data;

a character table updating module 53, configured to update a character model table of a character according to user model tables of all users under a same character;

a user recommendation probability calculation module 54, configured to calculate an interface recommendation probability of the user according to the user model table of the user;

a character recommendation probability calculation module 55, configured to calculate an interface recommendation probability of the character according to the character model table of the character; and a recommendation module 56, configured to: when a request for logging into the operation and maintenance platform is received, in a case that a user sending the request is a new user, determine target characters of the user sending the request, obtain interface recommendation probabilities of the target characters, and generate an interface recommendation link according to the interface recommendation probabilities of the target characters; and in a case that the user sending the request is a regular user, obtain an interface recommendation probability of the user sending the request, and generate an interface recommendation link according to the interface recommendation probability of the user sending the request, wherein the user recommendation probability calculation module is configured to: calculate an interface second-click rate according to the user model table of the user, and calculate the interface recommendation probability of the current interface with respect to the user according to a principle that an interface with a greater interface second-click rate is not a final interface, wherein the interface second-click rate is obtained by calculating according to an interface click-through frequency and the interface second-click times.

The apparatus for recommending the home page interface of the operation and maintenance platform of the present embodiment is configured to implement the method for recommending the home page interface of the operation and maintenance platform. Therefore, the implementation of the apparatus may refer to the foregoing embodiments of the method for recommending the home page interface of the operation and maintenance platform, and will not be repeated here.

Figure 6:
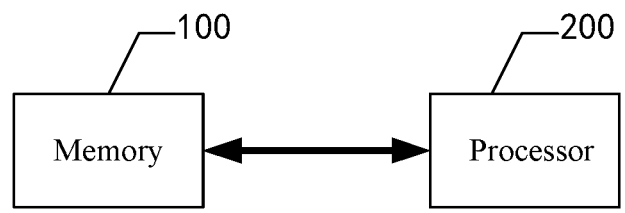
FIG. 6 is a schematic diagram of an embodiment of a device for recommending a home page interface of an operation and maintenance platform according to the present disclosure.

In addition, the present disclosure further provides a device for recommending a home page interface of an operation and maintenance platform, as shown in FIG. 6, including:

a memory 100, configured to store a computer program; and a processor 200, configured to execute the computer program to implement the method for recommending the home page interface of the operation and maintenance platform described above.

Each embodiment in the specification is described in a progressive way. Each embodiment focuses on the differences from other embodiments. The same and similar parts between embodiments may be seen in each other. For the device disclosed in the embodiment, because it corresponds to the method disclosed in the present embodiment, the description is relatively simple, and the relevant places may be seen in the method section.

The steps of a method or algorithm described in conjunction with the embodiments disclosed herein may be directly implemented in hardware, a software module executed by a processor, or a combination of the hardware and the software module. The software module may be placed in a random access memory (RAM), an internal memory, a read only memory (ROM), an electrically programmable ROM, an electrically erasable programmable ROM, a register, a hard disk, a mobile disk, a CD-ROM, or any storage medium in other forms known to the technical field.

The above solution provided by the present disclosure is introduced in detail. In this paper, examples are used to explain the principle and implementation of the present disclosure. The above embodiment is only used to help understand the method of this application and its core ideas. At the same time, for the general technical personnel in the art, according to the idea of the present, there may be changes in the implementation and scope of application. In a word, the content of the specification should not be understood as a limitation of the present disclosure.

The invention claimed is:

1. A method for recommending a home page interface of an operation and maintenance platform, comprising:
monitoring an operation behavior performed by a user on an interface on the operation and maintenance platform to obtain operation behavior data, wherein the operation behavior data comprises: interface second-click times and an interface use time period, and the interface second-click times refer to times of clicks by the user on a current interface to enter a deeper interface after the interface is opened;
updating a user model table of the user according to the operation behavior data;
updating a character model table of a character according to user model tables of all users under a same character;
calculating an interface recommendation probability of the user according to the user model table of the user;
calculating an interface recommendation probability of the character according to the character model table of the character;
when a request for logging into the operation and maintenance platform is received, in a case that a user sending the request is a new user, determining target characters of the user sending the request, obtaining interface recommendation probabilities of the target characters, and generating an interface recommendation link according to the interface recommendation probabilities of the target characters; and in a case that the user sending the request is a regular user, obtaining an interface recommendation probability of the user sending the request, and generating an interface recommendation link according to the interface recommendation probability of the user sending the request;
wherein calculating the interface recommendation probability of the user according to the user model table of the user comprises:
calculating an interface second-click rate according to the user model table of the user, and calculating the interface recommendation probability of the current interface with respect to the user according to a principle that an interface with a greater interface second-click rate is not a final interface, wherein the interface second-click rate is obtained by calculating according to an interface click-through frequency and the interface second-click times.

2. The method according to claim 1, wherein the operation behavior data further comprises: the interface click-through frequency, interface residence time, and interface operation times.

3. The method according to claim 2, wherein calculating the interface recommendation probability of the user according to the user model table of the user comprises:
calculating an interface click-through probability of the current interface according to the interface click-through frequency of the current interface and the interface click-through frequencies of all interfaces of the operation and maintenance platform;
calculating an interface residence probability of the current interface according to interface residence time of the current interface and the interface residence time of all the interfaces of the operation and maintenance platform;
calculating an interface operation probability of the current interface according to interface operation times of the current interface and the interface operation times of all the interfaces of the operation and maintenance platform;
calculating an interface use time period probability of the current interface according to an interface use time period of the current interface and the interface use time periods of all the interfaces of the operation and maintenance platform; and
calculating the interface recommendation probability of the current interface with respect to the user according to the interface click-through probability, the interface residence probability, the interface operation probability, the interface use time period probability, and the interface second-click rate and based on the principle that the interface with the greater interface second-click rate is not the final interface.

4. The method according to claim 3, wherein the operation behavior data further comprises: interface last use time;
calculating the interface recommendation probability of the user according to the user model table of the user comprises:
determining interfaces with difference values between interface last use time and current time less than a preset threshold, and obtaining an interface set;
for each interface of the interface set, calculating an interface click-through probability of the interface according to the interface click-through frequency of the interface and the interface click-through frequencies of all the interfaces of the operation and maintenance platform;
for each interface of the interface set, calculating an interface residence probability of the interface according to the interface residence time of the interface and the interface residence time of all the interfaces of the operation and maintenance platform;
for each interface of the interface set, calculating an interface operation probability of the interface according to the interface operation times of the interface and the interface operation times of all the interfaces of the operation and maintenance platform;
for each interface of the interface set, calculating an interface use time period probability of the interface according to the interface use time period of the interface and the interface use time periods of all the interfaces of the operation and maintenance platform; and
calculating the interface recommendation probability of the current interface with respect to the user according to the interface click-through probability, the interface residence probability, the interface operation probability, the interface use time period probability, and the interface second-click rate.

5. The method according to claim 3, wherein calculating the interface recommendation probability of the current interface with respect to the user according to the interface click-through probability, the interface residence probability, the interface operation probability, the interface use time period probability, and the interface second-click rate comprises:

according to a target formula, calculating the interface recommendation probability of the current interface with respect to the user according to the interface click-through probability, the interface residence probability, the interface operation probability, the interface use time period probability, and the interface second-click rate, wherein the target formula is:

$$f_{V_i} = (\alpha f_{P_i} + \beta f_{T_i} + \gamma f_{O_i} + \delta f_{C_i}) * \left(1 - \frac{S_i}{P_i}\right)$$

wherein $f_{P_i}$, $f_{T_i}$, $f_{O_i}$, $f_{C_i}$ respectively represent the interface click-through probability, the interface residence probability, the interface operation probability, and the interface use time period probability; $\alpha$, $\beta$, $\gamma$, $\delta$ represent weighting coefficients; $S_i/P_i$ represents the interface second-click rate; $P_i$ represents the interface click-through frequency; $S_i$ represents the interface second-click times; i represents an interface reference sign; and $f_{V_i}$ represents the interface recommendation probability of an $i^{th}$ interface.

6. The method according to claim 2, wherein monitoring the operation behavior performed by the user on the interface on the operation and maintenance platform to obtain the operation behavior data comprises:

monitoring the operation behavior performed by the user on the interface on the operation and maintenance platform in days to obtain the operation behavior data, wherein in the user model table and the character model table, fields corresponding to the interface use time period are used for recording times of use of the interface by the user and the character within each period.

7. The method according to claim 1, wherein updating the user model table of the user according to the operation behavior data comprises:

determining whether the user model table of the user records historical operation behavior data;

in a case that the user model table of the user records the historical operation behavior data, updating the user model table of the user according to the operation behavior data and the historical operation behavior data; and in a case that the user model table of the user does not record historical the operation behavior data, writing the operation behavior data into the user model table of the user.

8. The method according to claim 1, wherein generating the interface recommendation link according to the interface recommendation probabilities of the target characters comprises:

generating a preset quantity of interface recommendation links according to the interface recommendation probabilities of the target characters from large to small.

9. A device for recommending a home page interface of an operation and maintenance platform, comprising:

a memory, configured to store a computer program; and
a processor, configured to run the computer program to implement the method for recommending the home page interface of the operation and maintenance platform according to claim 1.

10. The method according to claim 1, wherein second-click of the interface second-click times refers to a behavior of the user to click the current interface to enter a deeper interface after a page is opened.

11. The method according to claim 1, wherein the interface second-click rate refers to a ratio of a quantity of second-clicks to a quantity of arriving at the current interface.

12. The method according to claim 10, wherein when the request for logging into the operation and maintenance platform is received, in the case that the user sending the request is the new user, determining the target characters of the user sending the request, obtaining the interface recommendation probabilities of the target characters, and generating the interface recommendation link according to the interface recommendation probabilities of the target characters; and in the case that the user sending the request is the regular user, obtaining the interface recommendation probability of the user sending the request, and generating the interface recommendation link according to the interface recommendation probability of the user sending the request comprises:

when a login user is the new user, recommending the final interface according to the interface recommendation probability of the character; and when the login user is the regular user, recommending the final interface according to the interface recommendation probability of the user.

13. The method according to claim 10, wherein $\alpha$, $\beta$, $\gamma$, $\delta$ are values between 0 and 1, and $\alpha$, $\beta$, $\gamma$, $\delta$ meet $\alpha+\beta+\gamma+\delta=1$.

14. The device according to claim 9, wherein the operation behavior data further comprises: the interface click-through frequency, interface residence time, and interface operation times.

15. The device according to claim 14, wherein calculating the interface recommendation probability of the user according to the user model table of the user comprises:

calculating an interface click-through probability of the current interface according to the interface click-through frequency of the current interface and the interface click-through frequencies of all interfaces of the operation and maintenance platform;

calculating an interface residence probability of the current interface according to interface residence time of the current interface and the interface residence time of all the interfaces of the operation and maintenance platform;

calculating an interface operation probability of the current interface according to interface operation times of the current interface and the interface operation times of all the interfaces of the operation and maintenance platform;

calculating an interface use time period probability of the current interface according to an interface use time period of the current interface and the interface use time periods of all the interfaces of the operation and maintenance platform; and calculating the interface recommendation probability of the current interface with respect to the user according to the interface click-through probability, the interface residence probability, the interface operation probability, the interface use time period probability, and the interface second-click rate and based on the principle that the interface with the greater interface second-click rate is not the final interface.

16. The device according to claim 15, wherein the operation behavior data further comprises: interface last use time;

calculating the interface recommendation probability of the user according to the user model table of the user comprises:

determining interfaces with difference values between interface last use time and current time less than a preset threshold, and obtaining an interface set;

for each interface of the interface set, calculating an interface click-through probability of the interface according to the interface click-through frequency of the interface and the interface click-through frequencies of all the interfaces of the operation and maintenance platform;

for each interface of the interface set, calculating an interface residence probability of the interface according to the interface residence time of the interface and the interface residence time of all the interfaces of the operation and maintenance platform;

for each interface of the interface set, calculating an interface operation probability of the interface according to the interface operation times of the interface and the interface operation times of all the interfaces of the operation and maintenance platform;

for each interface of the interface set, calculating an interface use time period probability of the interface according to the interface use time period of the interface and the interface use time periods of all the interfaces of the operation and maintenance platform; and calculating the interface recommendation probability of the current interface with respect to the user according to the interface click-through probability, the interface residence probability, the interface operation probability, the interface use time period probability, and the interface second-click rate.

17. The device according to claim 15, wherein calculating the interface recommendation probability of the current interface with respect to the user according to the interface click-through probability, the interface residence probability, the interface operation probability, the interface use time period probability, and the interface second-click rate comprises:

according to a target formula, calculating the interface recommendation probability of the current interface with respect to the user according to the interface click-through probability, the interface residence probability, the interface operation probability, the interface use time period probability, and the interface second-click rate, wherein the target formula is:

$$f_{V_i} = (\alpha f_{P_i} + \beta f_{T_i} + \gamma f_{O_i} + \delta f_{C_i}) * \left(1 - \frac{S_i}{P_i}\right)$$

wherein $f_{P_i}$, $f_{T_i}$, $f_{O_i}$, $f_{C_i}$ for respectively represent the interface click-through probability, the interface residence probability, the interface operation probability, and the interface use time period probability; $\alpha$, $\beta$, $\gamma$, $\delta$ represent weighting coefficients; $S_i/P_i$ represents the interface second-click rate; $P_i$ represents the interface click-through frequency; $S_i$ represents the interface second-click times; i represents an interface reference sign; and $f_{v_i}$ represents the interface recommendation probability of an $i^{th}$ interface.

18. The device according to claim 14, wherein monitoring the operation behavior performed by the user on the interface on the operation and maintenance platform to obtain the operation behavior data comprises:

monitoring the operation behavior performed by the user on the interface on the operation and maintenance platform in days to obtain the operation behavior data, wherein in the user model table and the character model table, fields corresponding to the interface use time period are used for recording times of use of the interface by the user and the character within each period.

19. The device according to claim 9, wherein updating the user model table of the user according to the operation behavior data comprises:

determining whether the user model table of the user records historical operation behavior data;

in a case that the user model table of the user records the historical operation behavior data, updating the user model table of the user according to the operation behavior data and the historical operation behavior data; and in a case that the user model table of the user does not record historical the operation behavior data, writing the operation behavior data into the user model table of the user.

* * * * *